United States Patent [19]
Myers et al.

[11] Patent Number: 5,710,854
[45] Date of Patent: Jan. 20, 1998

[54] MULTI-MODE OPTICAL T-SPLITTER AND METHOD OF FABRICATING SAME

[75] Inventors: W. Michael Myers; Donnette E. Haney; Shin Sumida; Tadashi Miyashita, all of Columbus, Ohio

[73] Assignee: Photonic Integration Research, Inc., Columbus, Ohio

[21] Appl. No.: 423,414

[22] Filed: Apr. 15, 1995

Related U.S. Application Data

[63] Continuation-in-part of Ser. No. 227,135, Apr. 13, 1994, Pat. No. 5,473,721.
[51] Int. Cl.$^6$ .................................................. G02B 6/10
[52] U.S. Cl. ........................... 385/132; 385/129; 385/48
[58] Field of Search ........................... 385/132, 48, 50, 385/14, 39, 15, 24, 129; 427/555; 430/5

[56] References Cited

U.S. PATENT DOCUMENTS

| | | | |
|---|---|---|---|
| 4,726,012 | 2/1988 | Amadieu et al. | 385/24 |
| 4,799,756 | 1/1989 | Hirschfeld | 385/15 |
| 4,878,727 | 11/1989 | Boiarski et al. | 385/50 |
| 5,230,970 | 7/1993 | Atwood et al. | 430/5 |
| 5,281,447 | 1/1994 | Brady et al. | 427/555 |
| 5,369,719 | 11/1994 | Mishima et al. | 385/48 |
| 5,473,721 | 12/1995 | Myers et al. | 385/129 |

OTHER PUBLICATIONS

Corion Corporation, "Optical Filters and Coatings", 1983, p. 65 no month.
Oriel Corporation, "Optics & Filters, vol. III", 1990, pp. 7–8 no month.

*Primary Examiner*—Phan T. H. Palmer
*Attorney, Agent, or Firm*—Porter, Wright, Morris & Arthur

[57] ABSTRACT

This invention comprises a multi-mode optical "T"-splitter for the coupling of multi-mode optical fibers to, from, and between other fibers, sources, detectors, and other optical elements, and method of fabricating same. The optical T-splitters of this invention may use tubular waveguides to provide a better match with round fibers, resulting in higher efficiency, lower loss, and other improvements. The optical T-splitter is comprised of waveguides forming a substantially T-shaped geometry in a substrate. A reflecting element is inserted at the junction of the "T" to split input light entering one of the legs of the "T" into light being output between the other two legs of the "T". The "T" configuration of these tubular channels and the insertion of various types of reflecting elements at the "T" junction, make it possible to perform any number of optical functions, including splitting, tapping, mixing, and coupling. The optical splitter of this invention is relatively easy to manufacture, is inexpensive, and exhibits low propagation and coupling loss.

36 Claims, 6 Drawing Sheets

*Excess Loss vs Split Ratio for 1x2 T-Type Splitter*

MULTI-MODE OPTICAL T-SPLITTER AND METHOD OF FABRICATING SAME

RELATED APPLICATION

This is a continuation-in-part of application for U.S. Pat. Ser. No. 08/227,135 filed on Apr. 13, 1994, now U.S. Pat. No. 5,473,721 having the common assignee of the present invention and incorporated herein by reference for all purposes.

FIELD OF THE INVENTION

This invention relates to optical circuits for the coupling of multi-mode optical fibers to other fibers, sources, detectors, and conventional optical elements, and method of fabricating same. The multi-mode optical splitter of this invention can be applied to various types of optical circuits.

BACKGROUND AND SUMMARY OF THE INVENTION

Optical splitters (or taps) are fundamental and essential elements in any fiber-optic network. For single-mode fiber circuits, the most common method of splitting an optical signal is to use a directional coupler, where the cores of two or more fibers (or waveguides) are brought sufficiently close such that a portion of the light in the input fiber is transferred to the cores of the adjacent fibers. Single-mode circuits can also rely on a Y-branch to split the light, which usually results in a slightly higher excess loss.

Multi-mode optical circuits typically use a Y-branch type of splitter to divide the light into one or more outputs. A number of patents that relate to multi-mode Y-branch splitters are U.S. Pat. Nos.: 4,134,640, 4,142,877, 4,164,364, 4,089,583, 4,666,236 and 4,878,727. The Y-branch splitter has several advantageous properties: the Y-branch design can be modified to accommodate any split ratio and there are no additional processing or manufacturing steps after the optical circuit is formed. Several disadvantages of the Y-branch splitter are that: 1) the splitting ratio can be modal dependent and difficult to control; 2) in some cases, the Y-branch structure can cause significant excess loss; and 3) curved waveguides are usually required to adequately separate the outputs, thereby adding to the excess loss and increasing the size of the optical circuit.

The invention described herein is a multi-mode optical splitter based on a "T" design that incorporates a reflective element at the "T" junction. Some of the advantages to this design are that there are no curves, the design is simple, the excess loss is low, the circuit size is small, and with inputs and outputs all at 0°, 90° or 180° angles, this splitter can be easily integrated with sources and detectors in a small package.

The present invention provides a multi-mode optical splitter to couple light to, from, and between multi-mode optical fibers, optical sources/detectors, and various other optical elements, and method of fabricating this multi-mode optical splitter. This invention provides a simple and flexible means of manufacturing multi-mode optical splitters that exhibit low excess loss, excellent uniformity and repeatability, efficient coupling to multi-mode optical fibers, and good environmental performance. The methods of this invention are best applied to circuits that are used with multi-mode optical fibers having an outside diameter of greater than about 350 μm, but with some modifications, these methods can be applied to the manufacture of circuits for use with fiber diameters as small as 100 μm or less.

Many types of application-specific splitters can be manufactured by the methods of this invention. Furthermore, this invention provides a relatively easy means of integrating multi-mode optical circuits with many types of optical elements, such as sources, detectors, mirrors, diffraction gratings, dielectric filters, or even slots and wells for chemical sensing agents.

The splitter described in this invention is based on a "T" design, where a partially reflecting mirror (beam splitter) is placed at the junction of the "T". Furthermore, a type of mirror is described in this invention which overcomes some of the drawbacks of conventional beam splitters.

The "T" design can be used to implement many similar optical functions depending on the type of reflecting element inserted and its precise position at the "T" junction. The essential elements of this invention can best be conveyed by the arrangement of two optical fibers (or optical waveguides) in the shape of a "T". A cavity, groove, or slot is provided at the "T" junction that will be used for inserting various reflecting elements. There are many ways for making the reflector cavity; among them are molding, machining, dicing (sawing), etching, etc. The essential characteristics for the reflector cavity are that it be precisely positioned and possess relatively smooth and straight walls.

In the case of a basic uni-directional splitter (or tap), a partially transmitting/partially reflecting mirror can be inserted into the slot. The slot is at a 45° angle with respect to the top of the "T", such that the reflected light is directed into the leg of the "T". Another variation might use a wavelength dependent reflector or interference filter in the slot, such that light of one wavelength is reflected into the leg of the "T" and light of another wavelength is passed un-deviated. In the case of a direction-independent 1×2 splitter, another variation would use a triangular-shaped mirror inserted into a cavity at the "T" junction, such that input light from any one of the three ports at the ends of the legs of the "T" will be equally divided between the remaining two output ports at the ends of the legs of the "T".

Another aspect of this invention is the use of a non-conventional mirror. The most common types of partially reflecting/partially transmitting mirrors are made by depositing extremely thin metal films or by depositing a multi-layer dielectric stack (interference filter). In this application, such mirrors have several disadvantages: 1) precise transmission and reflection properties are difficult to achieve; 2) thin metal films may lack stability under extreme environmental conditions; 3) the films reflectance value can be affected by wavelength, angle of incidence, and modal properties of the fiber or waveguide; and 4) in the case of thin metal films, the losses due to absorption can be high. The mirror described in a preferred embodiment of this invention consists of a relatively thick metal film with an array of small holes in it—a perforated mirror. The holes are produced by a lithographic process that allows for tight control of the geometry and dimensions. The percent open area of the mirror, controlled by the hole dimensions, will define what percentage of the light is transmitted. Finally, the holes are small enough with respect to the waveguide dimensions so that positioning of the mirror in the slot is not critical, yet large enough so that diffraction effects are minimized.

The waveguides for the optical T-splitter of this invention can be as simple as sliding fibers into pre-formed channels or filling pre-formed channels in a substrate of suitable index with a core resin of relatively higher index. In the latter case, a substrate having a predetermined index of refraction is provided. The channels form a substantially T-shaped geometry in the substrate. The channels are filled with an optically conductive waveguide material; the waveguide material has a relatively higher index of refraction than the substrate. Fibers or optical elements can then be operatively connected to the face of, or inserted inside of, the openings at the ends of the legs of the "T" to complete an optical circuit. The channels may be tubular, rectangular, square or arbitrarily shaped and may be formed by drilling operations such as conventional machining methods or laser drilling methods.

As disclosed in Applicants' pending parent application Ser. No. 08/227,135, now U.S. Pat. Ser. No. 5,473,721 which is incorporated herein by reference for all purposes, multi-mode optical circuits, including optical T-splitters, can also be fabricated by providing a substrate having a predetermined index of refraction, wherein the substrate is composed of a sandwich structure with two halves. Tubular channels are formed in the substrate by making shaped grooves in a surface of the halves to define an optical circuit. When the halves are adhered together, channels are formed in the substrate. The channels that are formed in the surface of the halves may be semi-circular, rectangular, or arbitrarily shaped. This correspondingly results in the channels having a circular, rectangular, or arbitrary shape in cross-section. The methods of forming such channels can also be used for making cavities or slots in the substrate at the junction of the "T" that can hold various reflective elements.

The foregoing and other objects and advantages of the present invention will become more apparent when viewed in light of the accompanying drawings and the following description.

DETAILED DESCRIPTION OF THE INVENTION AND THE PREFERRED EMBODIMENT(S)

The optical "T"-splitters of this invention, in a preferred embodiment, are referred to as Machined (or Molded) Acrylic, Resin Core, Optical Circuits, or MARCOCs. Acrylic was used as a substrate in the embodiment detailed herein, but other substrate materials known in the art may be adapted to the methods of this invention.

In a preferred embodiment of this invention, a computer numerically controlled (CNC) milling machine is used to cut semi-circular grooves in a strip or sheet of a suitable plastic material. Acrylic or acrylic composition is an example of a suitable plastic, since it has a relatively low index of refraction, good optical quality, and it can be easily polished by exposure to solvents or solvent vapors. The pattern of the machined grooves will form a "T" geometry. Multiple copies of the circuit pattern can be programmed to cut in a single operation.

The CNC milling machine will typically use a ball-nose end-mill or a micro-burr as a cutting tool, where the tool diameter is essentially the same as the fiber or fiber bundle diameter. The cutting depth is typically about one-half of the fiber or fiber bundle diameter. Precision of the CNC machining, or subsequent molding operations can be as accurate as ±5 μm, which is more than adequate for most multi-mode splitter circuits.

After the circuit halves are machined, the top and bottom halves are aligned and adhered together such that the semi-circular grooves become essentially round tubular channels through the body of the substrate, thereby forming a "T" configuration. These channels can then be filled with a suitable liquid or resin having a relatively higher index of refraction than the machined or molded substrate circuit body. Fibers or optical elements can then be connected to the face of, or inserted inside of, the tubular openings to complete the optical circuit.

The methods and devices of this invention are most easily applied to MARCOCs that will be used with multi-mode optical fibers having an outside diameter of about 350 μm or larger, but the present invention can be used with smaller optical fibers and elements as well. For fibers in the 350 μm or larger size range, a CNC mill can be used to directly machine the grooves into the substrate body of the circuit by using commercially available end-mill tools or micro-burrs. The MARCOCs and fabrication processes described here were designed specifically for use with plastic multi-mode optical fibers, having a numerical aperture of ≈0.47, and an outside diameter of ≈750 microns. However, the methods of this invention can be applied to fabricating optical circuits for use with most other types and sizes of multi-mode fibers.

Figure 1A:
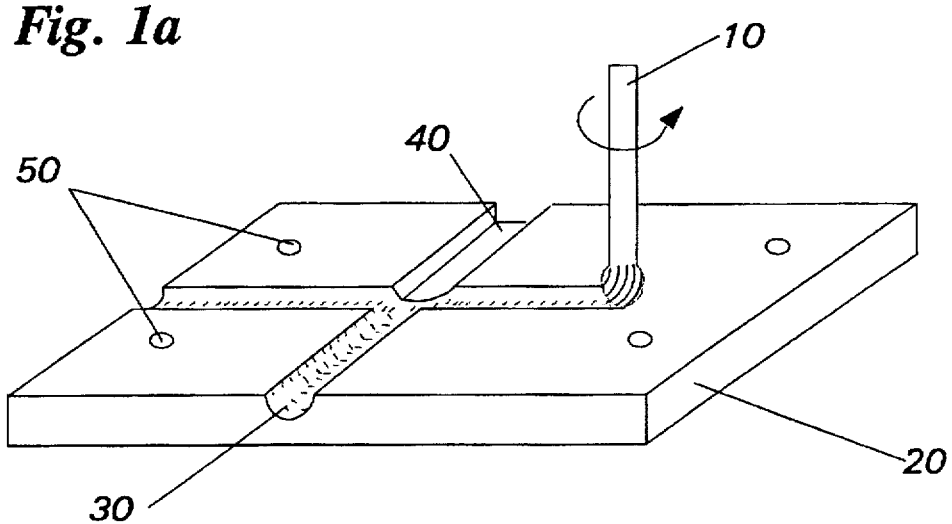
FIG. 1a shows the basic "T" configuration with semi-circular grooves and a mirror cavity machined into a substrate.

FIG. 1a shows the arrangement for cutting the circuit grooves 30, a mirror cavity 40, and alignment holes 50 into a suitable substrate 20. The semi-circular grooves can be cut with a ball-nose endmill 10, or various types of micro-burrs. The tool for cutting the mirror cavity 40 can be a flat end mill. The depth of the circuit-groove cut is typically one-half of the waveguide or fiber diameter, and the depth of the mirror cavity 40 will vary, depending on the mirror size.

Figure 1B:
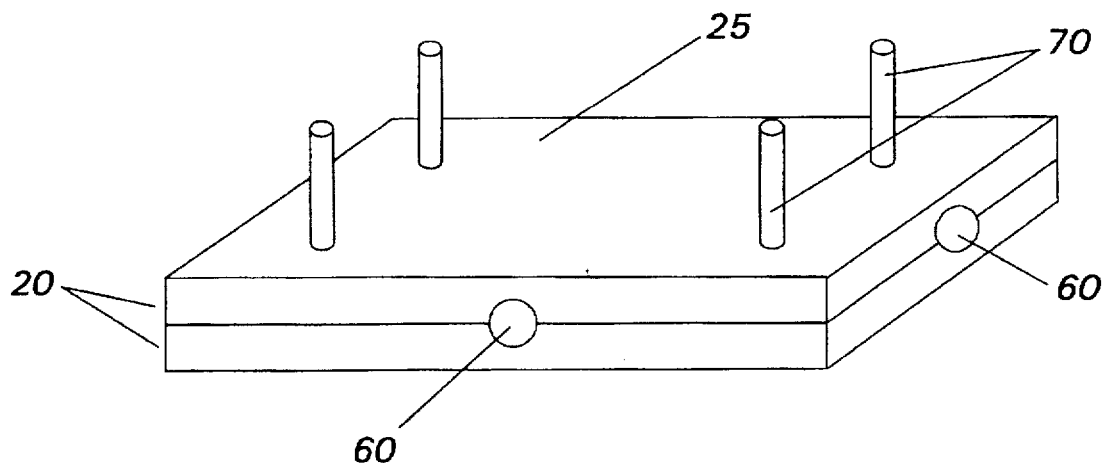
FIG. 1b shows the "T"-splitter circuit after assembly, with alignment pins and tubular channels.

FIG. 1b shows a perspective view of the "T"-splitter after the two circuit halves have been assembled to form the substrate circuit body 25. The semi-circular grooves 30 now form tubular channels 60. The tubular channels 60 can be filled with a core resin having a relatively higher index of refraction than the substrate circuit body 25. Alternatively, optical fibers can be inserted into the tubular channels 60 when the device is assembled. Alignment pins 70 can be inserted into the alignment holes 50.

Figure 2:
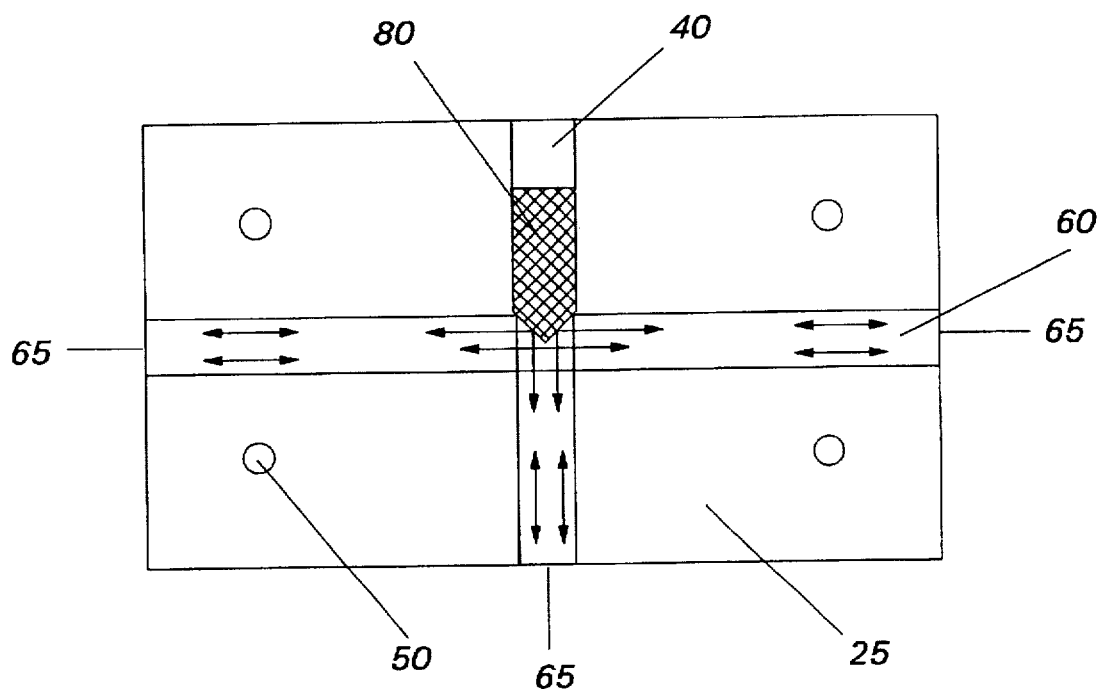
FIG. 2 shows a "T"-splitter design with a triangular mirror inserted into the mirror cavity at the "T" junction.

FIG. 2 shows a top view of the "T"-splitter circuit after inserting a triangular mirror 80 into the mirror cavity 40. In this embodiment, the "T"-splitter functions as a direction-independent 1×2 splitter; the light that enters any one of the three ports 65 at the ends of the legs of the "T" will be equally split among the remaining two ports. The triangular mirror 80 can also be used to split light unequally, if so desired, among the remaining two ports. This type of "T"-splitter is unique since conventional Y-branch splitters will function as such in only one direction. The shape and dimensions of the mirror cavity 40 can be made to simplify the assembly and mirror insertion step. In the embodiment described here, the walls of the mirror cavity are such that the mirror is inserted until it stops and the placement that results ensures an equal splitting ratio. The triangular mirror in the embodiment described here was made of glass and was shaped, polished and metalized by conventional optical fabrication methods. A more practical and manufacturable method of producing such a mirror is to machine or mold the mirror surfaces directly into the substrate circuit body 25. The mirror surfaces would then be metalized directly, eliminating the step of inserting and positioning a (separate) conventional glass mirror.

Figure 3:
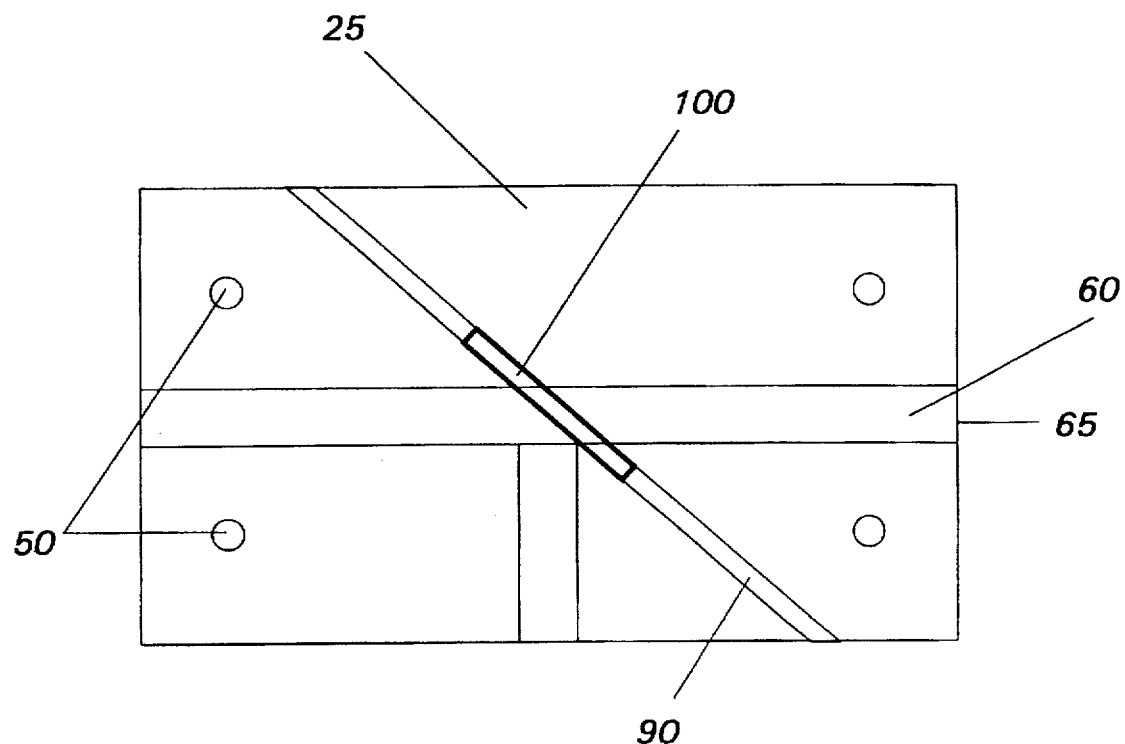
FIG. 3 shows the "T"-splitter design with a beam splitting mirror placed into a slot at the "T" junction.

FIG. 3 FIG. 3 shows another embodiment of the "T"-splitter that uses a partially reflecting mirror at the "T" junction to tap a portion of the incoming light. A mirror slot 90 is created at the "T" junction, into which a partially reflecting mirror 100 is inserted. The mirror slot 90 can be machined on a CNC mill, cut with a precision dicing saw, or molded into the circuit body 25. The requirements for the mirror slot 90 are that it be precisely positioned and have relatively smooth walls. The "T" design can accommodate any split ratio by simply changing the beam-splitting mirror 100, whereas a Y-branch splitter requires a modified branch design to change the split ratio.

Conventional beam splitters (partially reflecting mirrors) typically use a thin film of a reflective metal. The thickness of the metal determines how much of the incident light will be reflected and how much will be transmitted. Beam splitters made with a thin metal film have the following disadvantages:

1) Precise reflectance values are difficult to obtain since this requires controlling the metal film thickness to within ±10 Angstroms.

2) The reflectance of some metal films can be strongly affected by environmental conditions, especially when the metal is very thin.

Figure 4:
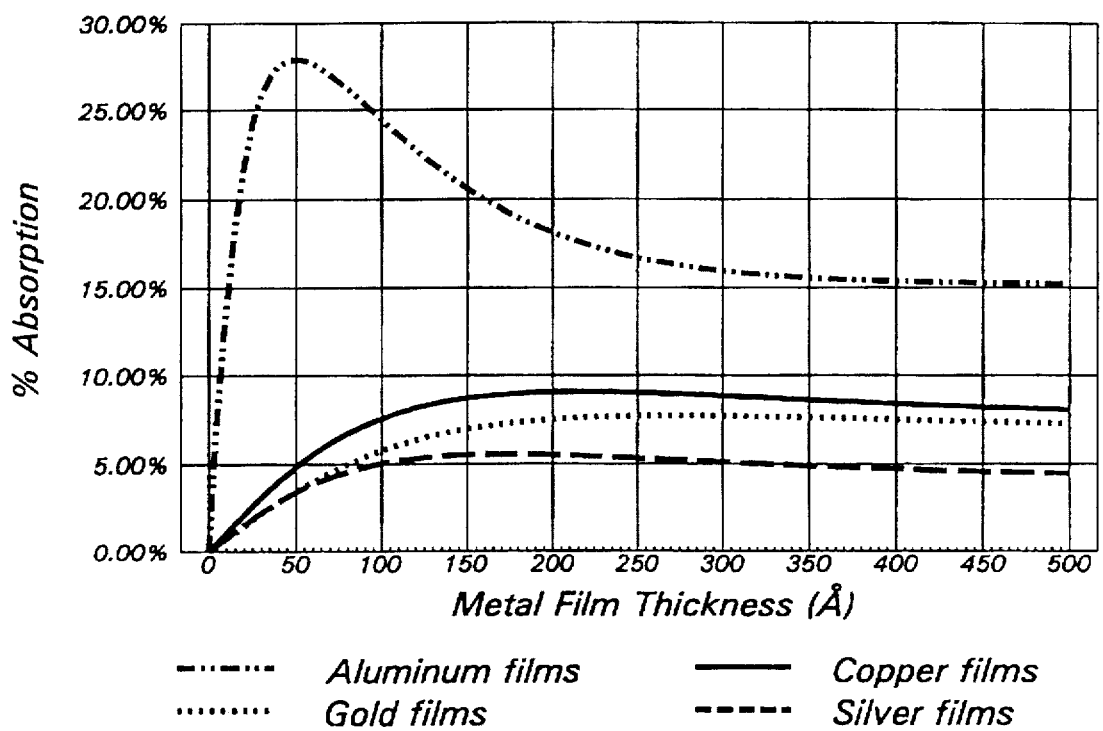
FIG. 4 is a graph illustrating the theoretical absorption of several reflective metal films as a function of metal thickness.

3) The absorption of metal films is higher (lower efficiency) when the metal is thin enough to partially transmit and partially reflect the light. FIG. 4 is a graph illustrating the theoretical absorption for several reflective metals as a function of film thickness. In the thickness region where the metal film is partially transmitting, the absorption is the highest.

Another type of widely used beam splitter uses an interference filter or multi-layer dielectric coating to control the reflectance of a film. Such types of beam splitters are more efficient and less sensitive to environmental effects than the thin metal film beam splitters, but they are more sensitive to the wavelength of the light and the angle of incidence. As with the thin metal film beam splitters, precise and repeatable splitting ratios may be difficult and expensive to obtain.

Figure 5:
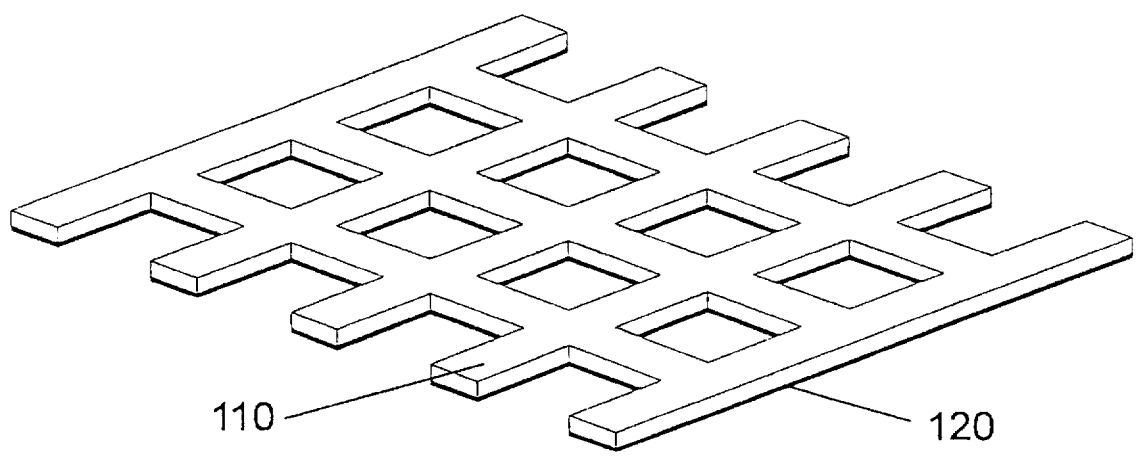
FIG. 5 shows a perforated mirror beam-splitter, where the percent open area of the reflecting film determines the percent transmission of light through the beam splitter.

A perforated mirror beam-splitter is shown in FIG. 5. In a preferred embodiment, a two-dimensional square-mesh array was used, but similar results can be realized with other patterns. A relatively thick layer of gold was chosen as the reflecting metal since the reflectance of gold is high from the mid-visible through the infra-red portions of the spectrum. Also, the reflectance of gold is not affected by environmental conditions. To enhance the adhesion of the gold film 110 to the substrate, a thin film of either chrome or titanium 120 is deposited first. For other reflective metals, this may not be necessary.

The perforations in the gold film are formed by a photo-lithographic lift-off process, which is well documented by those skilled in the art. Such a process is highly reproducible and precise. In general, the mesh period should be small enough to present many openings across the face of the waveguide, but large enough to minimize diffraction effects.

The excess loss of an optical circuit refers to any loss that is beyond the theoretical split loss. For example, a perfect 1×2 splitter should direct 50% of the input light to output 1 and 50% of the input light to output 2. In practice, a typical 1×2 multi-mode splitter delivers about 30% of the light to output 1 and 30% to output 2; 40% of the light is lost, which translates into approximately 1.75 dB of excess loss. Some Y-branch splitters exhibit a much higher excess loss than this.

Figure 6:
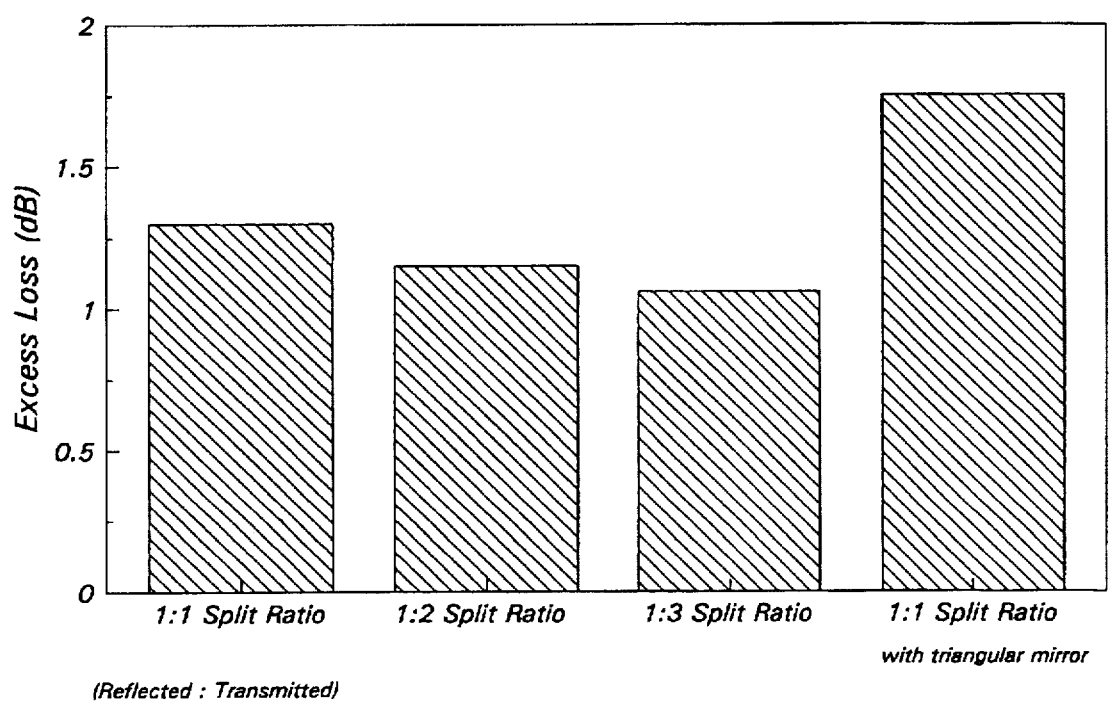
FIG. 6 is a chart illustrating the excess loss data for several "T"-splitters as a function of the split ratio and/or reflector type.

FIG. 6 shows the average excess loss for "T"-splitters manufactured with a triangular mirror and with perforated mirrors having varying degrees of reflectivity. The optical performance of the "T"-splitter exceeds that of other splitter types. In addition to good optical performance, the "T"-splitter affords the following advantages over other types of multi-mode optical splitters:

1) Simple design that is easy to manufacture;

2) Basic "T" design can accommodate various split ratios;

3) Compact circuit; doesn't require curved waveguides;

4) Circuit "chip" can integrate easily with other optical components;

5) Good environmental stability;

6) Precise and repeatable split ratios can be obtained with perforated mirror; and 7) Low excess loss.

The methods and devices of this invention have been reduced to practice and have demonstrated the concept, effectiveness and applicability of an optical "T"-splitter. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention which is described by the following claims.

What is claimed is:

1. A multi-mode optical splitter to couple light to, from, and between multi-mode optical fibers, optical sources/detectors and various optical elements, comprising:

a substrate;

waveguides forming a substantially T-shaped geometry in said substrate; and a perforated type partially reflecting mirror with an array of holes therethrough at the junction of the "T".

2. The multi-mode optical splitter of claim 1 wherein said substrate has a predetermined index of refraction and said waveguides are made by channels in said substrate, said channels being filled with optically conductive waveguide material to define a waveguide circuit configuration, said waveguide material having a relatively higher index of refraction than said substrate.

3. The multi-mode optical splitter of claim 2 wherein said channels are essentially tubular, rectangular, square or arbitrarily shaped.

4. The multi-mode optical splitter of claim 2 wherein said channels are filled with optically conductive waveguide material in a liquid state.

5. The multi-mode optical splitter of claim 1 wherein said waveguides are made by sliding optical fibers into channels in said substrate.

6. The multi-mode optical splitter of claim 1 wherein the legs of the "T" formed by said waveguides terminate at openings on the sides of said substrate, said legs being at about 90° or 180° angles from each other.

7. The multi-mode optical splitter of claim 1 wherein said perforated type partially reflecting mirror enables said splitter to be direction-independent such that input light from any one of the legs of the "T" will be divided between the remaining two legs of the "T".

8. The multi-mode optical splitter of claim 1 wherein said perforated type reflecting mirror comprises a reflecting film with said array of small holes therethrough, said perforated type reflecting mirror being produced by a lithographic process.

9. The multi-mode optical splitter of claim 1 further comprising a cavity or slot in said substrate in which said perforated type partially reflecting mirror is placed.

10. A multi-mode optical splitter to couple light to, from, and between multi-mode optical fibers, optical sources/ detectors and various optical elements, comprising:
  a substrate having a predetermined index of refraction;
  channels forming an approximately T-shaped geometry in said substrate, said channels being filled with optically conductive waveguide material to define a waveguide circuit configuration, said waveguide material having a relatively higher index of refraction than said substrate, wherein the legs of the "T" formed by said channels terminate at openings on the sides of said substrate, said legs being at about 90° or 180° angles from each other; and
  a perforated type partially reflecting mirror with an array of holes therethrough at the junction of the "T".

11. A multi-mode optical splitter to couple light to, from, and between multi-mode optical fibers, optical sources detectors, and various optical elements, comprising:
  a substrate having a predetermined index of refraction;
  tubular channels forming a substantially T-shaped geometry in said substrate, wherein said channels terminate at openings on sides of said substrate;
  a reflecting element at the junction of the "T"; and
  said channels filled with an optically conductive waveguide material in a liquid state, said waveguide material having a relatively higher index of refraction than said substrate, said waveguide material being selected from the group consisting of liquid epoxy and ultra-violet sensitive resin, and said waveguide material being curable to a solid state by application of means selected from the group consisting of heat, light and chemical reaction.

12. The multi-mode optical splitter of claim 11 wherein said reflecting element is a partially reflecting mirror.

13. The multi-mode optical splitter of claim 12 wherein said partially reflecting mirror is a perforated type reflecting mirror.

14. The multi-mode optical splitter of claim 13 wherein said perforated type reflecting mirror comprises a reflecting film with an array of small holes therethrough, said perforated type reflecting mirror being produced by a lithographic process.

15. The multi-mode optical splitter of claim 14 wherein said metal film comprises gold, silver, aluminum or other reflecting metal.

16. The multi-mode optical splitter of claim 11 wherein said reflecting element is a triangular shaped mirror.

17. The multi-mode optical splitter of claim 11 wherein said reflecting element enables said splitter to be direction-independent such that input light from any one of the legs of the "T" will be divided between the remaining two legs of the "T".

18. The multi-mode optical splitter of claim 11 wherein said reflecting element is a wavelength-dependent reflector or interference filter, such that input light filter, such any one of the legs of the "T" will be divided by wavelength between the remaining two leg of the "T", wherein light of one wavelength is reflected into one remaining leg of the "T" and light of another wavelength enters the other remaining leg of the "T".

19. The multi-mode optical splitter of claim 11 further comprising a cavity or slot in said substrate in which said reflecting element is placed.

20. The multi-mode optical splitter of claim 11 wherein said reflecting element is exchangeable with a different reflecting element.

21. A multi-mode optical circuit to couple light to, from, and between multi-mode optical fibers, optical sources/ detectors, and various optical elements, comprising:
  a substrate having a predetermined index of refraction, said substrate being composed of at sandwich structure with two halves;
  tubular channels in said substrate formed by making shaped grooves in a surface of the halves to define the optical circuit, such that when the halves are adhered together, said tubular channels forth a substantially T-shaped geometry in said substrate, wherein said channels terminate at openings on sides of said substrate; and
  a reflecting element at the junction of the "T".

22. The multi-mode optical splitter of claim 21 wherein said reflecting element is a partially reflecting mirror.

23. The multi-mode optical splitter of claim 22 wherein said partially reflecting mirror is a perforated type reflecting mirror.

24. The multi-mode optical splitter of claim 23 wherein said perforated type reflecting mirror comprises a reflecting film with an array of small holes therethrough, said perforated type reflecting mirror being produced by a lithographic process.

25. The optical circuit of claim 21, wherein said tubular channels are filled with an optically conductive waveguide material in a liquid state, said waveguide material having a relatively higher index of refraction than said substrate.

26. The optical circuit of claim 21, wherein the optically conductive waveguide material is selected from the group consisting of liquid epoxy and ultra-violet sensitive resin, and is curable to a solid state by application of at least one means selected from the group consisting of heat, light and chemical reaction.

27. The multi-mode optical splitter of claim 21 wherein said reflecting element is a triangular shaped mirror.

28. The multi-mode optical splitter of claim 21 wherein said reflecting element is a wavelength-dependent reflect or interference filter, such that input light from any one of the legs of the "T" will be divided by wavelength between the remaining two legs of the "T", wherein light of one wavelength is reflected into one remaining leg of the "T" and light of another wavelength enters the other remaining leg of the "T".

29. The multi-mode optical splitter of claim 21 further comprising a cavity or slot in said substrate in which said reflecting element is placed.

30. A method of fabricating a multi-mode optical T-splitter to couple light to, from, and between multi-mode optical fibers, optical sources/detectors and various optical elements, comprising the steps of:
  providing a substrate;
  forming a substantially T-shaped geometry with waveguides in said substrate; and providing a perforated type partially reflecting mirror with an array of holes therethrough at the junction of the "T".

31. The method of claim 30 further comprising the step of making a cavity or slot in said substrate in which said perforated type partially reflecting mirror is placed.

32. The method of claim 31 wherein said step of making a cavity or slot in said substrate is performed by milling, cutting, dicing, sawing, etching, machining or molding said substrate.

33. The method of claim 30 wherein channels are made in said substrate and said waveguides are made by sliding optical fibers into said channels in said substrate.

34. The method of claim 30 wherein channels are made in said substrate, said substrate having a predetermined index of refraction and said waveguides being made from said channels in said substrate, said channels being filled with optically conductive waveguide material to define a waveguide circuit configuration, and said waveguide material having a relatively higher index of refraction than said substrate.

35. The method of claim 30 wherein said perforated type partially reflecting mirror enables said splitter to be direction-independent such that input light from any one of the legs of the "T" will be divided between the remaining two legs of the "T".

36. The method of claim 30 wherein said perforated type partially reflecting mirror is produced by a lithographic process.

* * * * *